Figure 1:
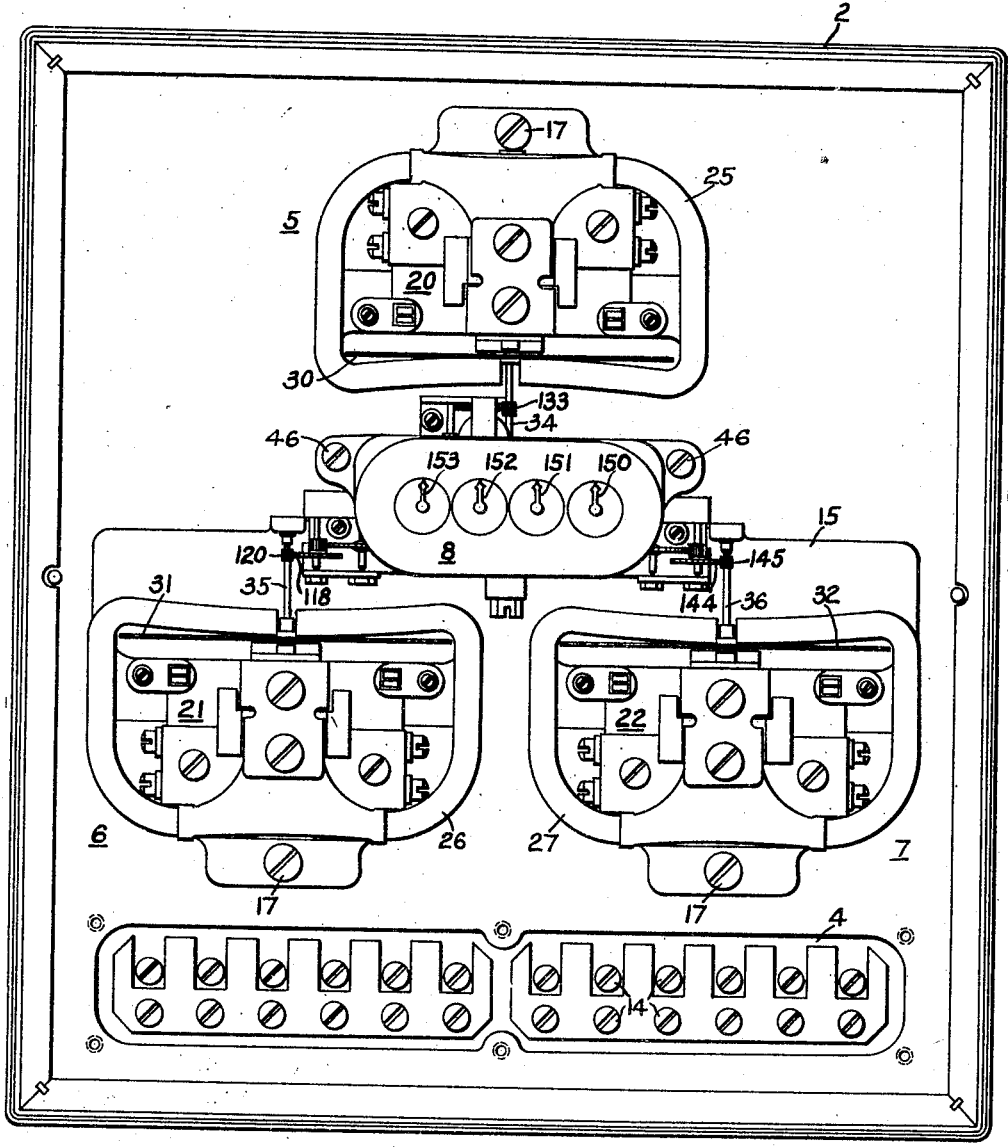

May 15, 1928.  1,669,572

C. OMAN

ELECTRICAL MEASURING INSTRUMENT

Filed Feb. 3, 1925  4 Sheets-Sheet 1

WITNESSES:
R. J. Butler.
F. H. Miller

INVENTOR
Carl Oman.
BY
Ebesley E. Barr
ATTORNEY

May 15, 1928.   1,669,572
C. OMAN
ELECTRICAL MEASURING INSTRUMENT
Filed Feb. 3, 1925   4 Sheets-Sheet 3

WITNESSES:
R. J. Butler.
F. H. Miller

INVENTOR
Carl Oman.
BY
Wesley G. Carr
ATTORNEY

May 15, 1928.

C. OMAN 1,669,572

ELECTRICAL MEASURING INSTRUMENT

Filed Feb. 3, 1925

4 Sheets-Sheet 4

WITNESSES:
R. J. Butler.
F. H. Miller

INVENTOR
Carl Oman.
BY
Wesley G. Carr
ATTORNEY

Patented May 15, 1928.

1,669,572

UNITED STATES PATENT OFFICE.

CARL OMAN, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed February 3, 1925. Serial No. 6,502.

My invention relates to electrical measuring instruments and particularly to polyphase induction meters of the watthour type.

One object of my invention is to provide an instrument of the above-indicated character that shall indicate the sum of quantities in several circuits or phases of a circuit and be free of damping errors during the de-energization of any number of the circuits.

Another object of my invention is to provide a watthour or similar meter in which several independently operable meter elements shall be so mechanically connected to each other and to a common register as to eliminate certain errors occurring in instruments embodying a plurality of armature disks.

A further object of my invention is to provide an induction watthour meter that shall be simple and durable in construction, economical to manufacture and effective in its operation.

In polyphase watthour meters of the induction type, it has been usual to mount armature disks on a single shaft and to provide an actuating electromagnet and a damping magnet for each disk. The number of these elements required depends upon the nature of the circuit.

When the electromagnets are energized, they produce a drag or damping effect on their respective discs, which is similar to that produced by the damping magnets. The total damping on the rotating element of the meter is the sum of this electromagnetic damping plus the permament-magnet damping and perhaps a small amount of friction. When one electromagnet is deenergized, its electro-magnetic damping is removed and errors are imposed on the registration of the other elements.

Accordingly, the error increases with the number of phases or circuits of which a measurement is desired and to compensate for, or to eliminate, the error becomes correspondingly increasingly difficult substantially in proportion to the number of added elements. In other words, while the error may be compensated for in a two-element meter by the introduction of a comparatively simple differential gear mechanism between the two independently operable meter elements, the problem is considerably more difficult where three or more elements are being used.

It is my aim to overcome the above-mentioned error more particularly in connection with meters embodying several meter elements or, in other words, in connection with instruments for operation in more than two circuits.

In practicing my invention, I provide a differential gear mechanism for so interconnecting several independently operable meter elements as to prevent the imposition of damping effects on the active elements during the inactivity of any number of the other elements. The mechanism is in the nature of superposed or compounded differential gear mechanisms of such construction and relation as to permit the instant response of the register or indicating means to operations of all or a smaller number of the elements.

Figure 2:
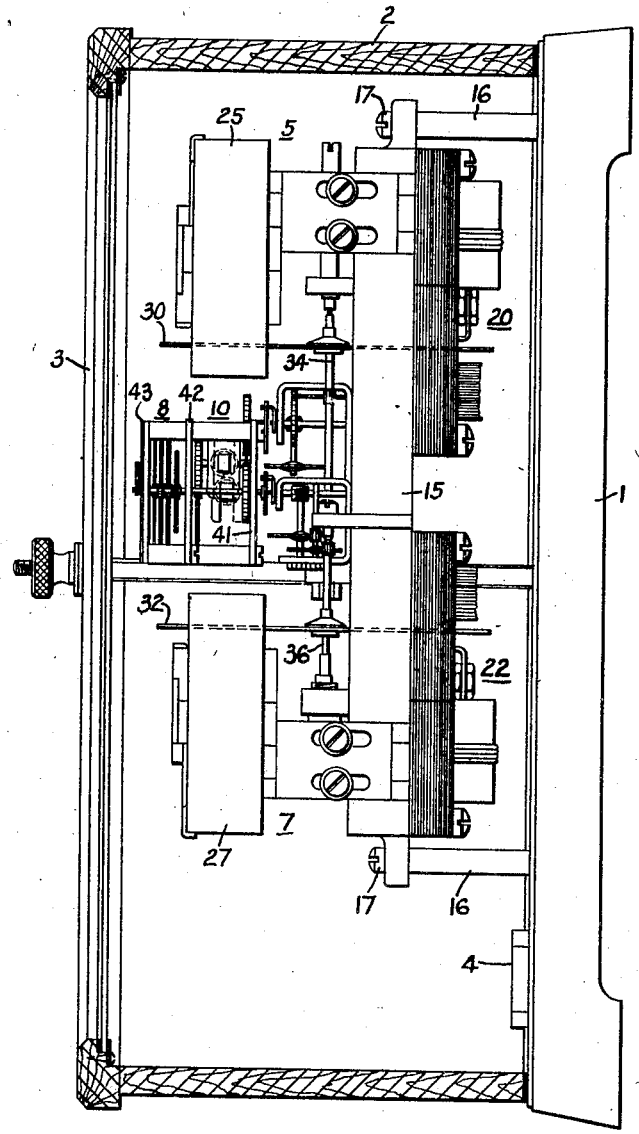
Figure 3:
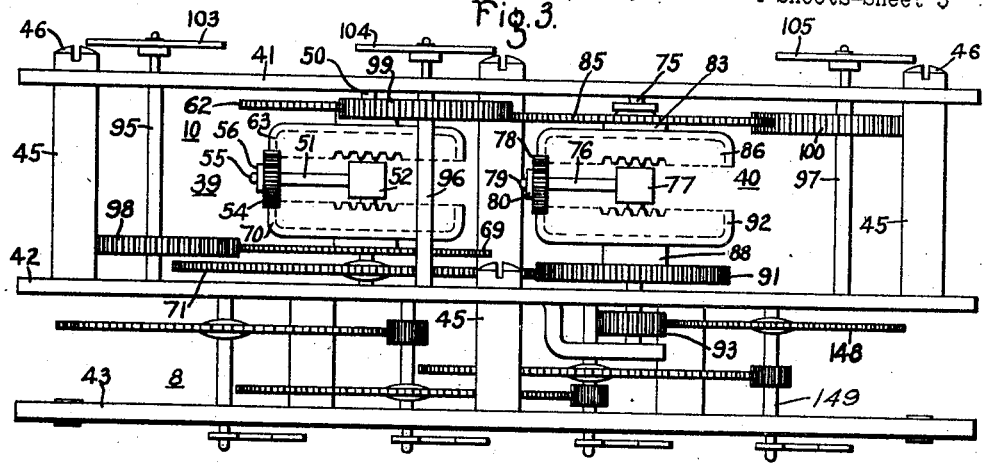
Figure 4:
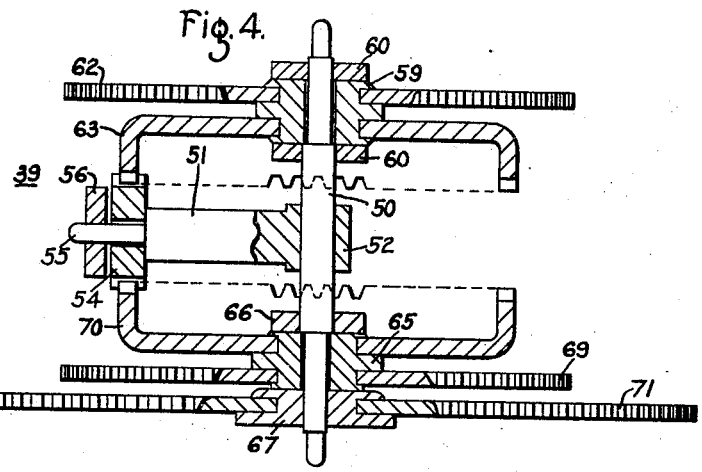
Figure 5:
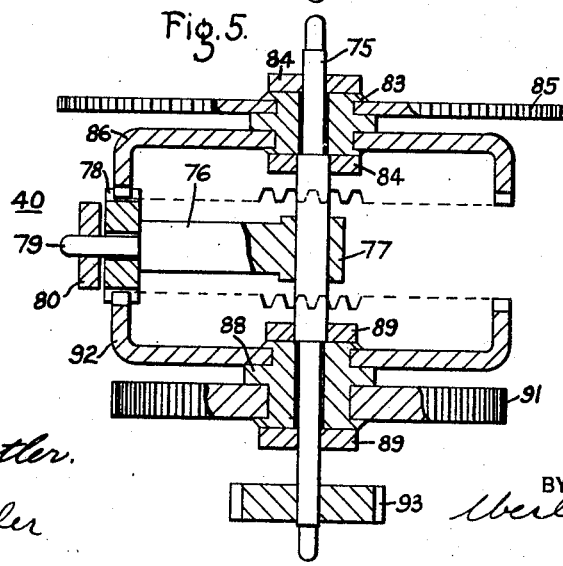
Figure 6:
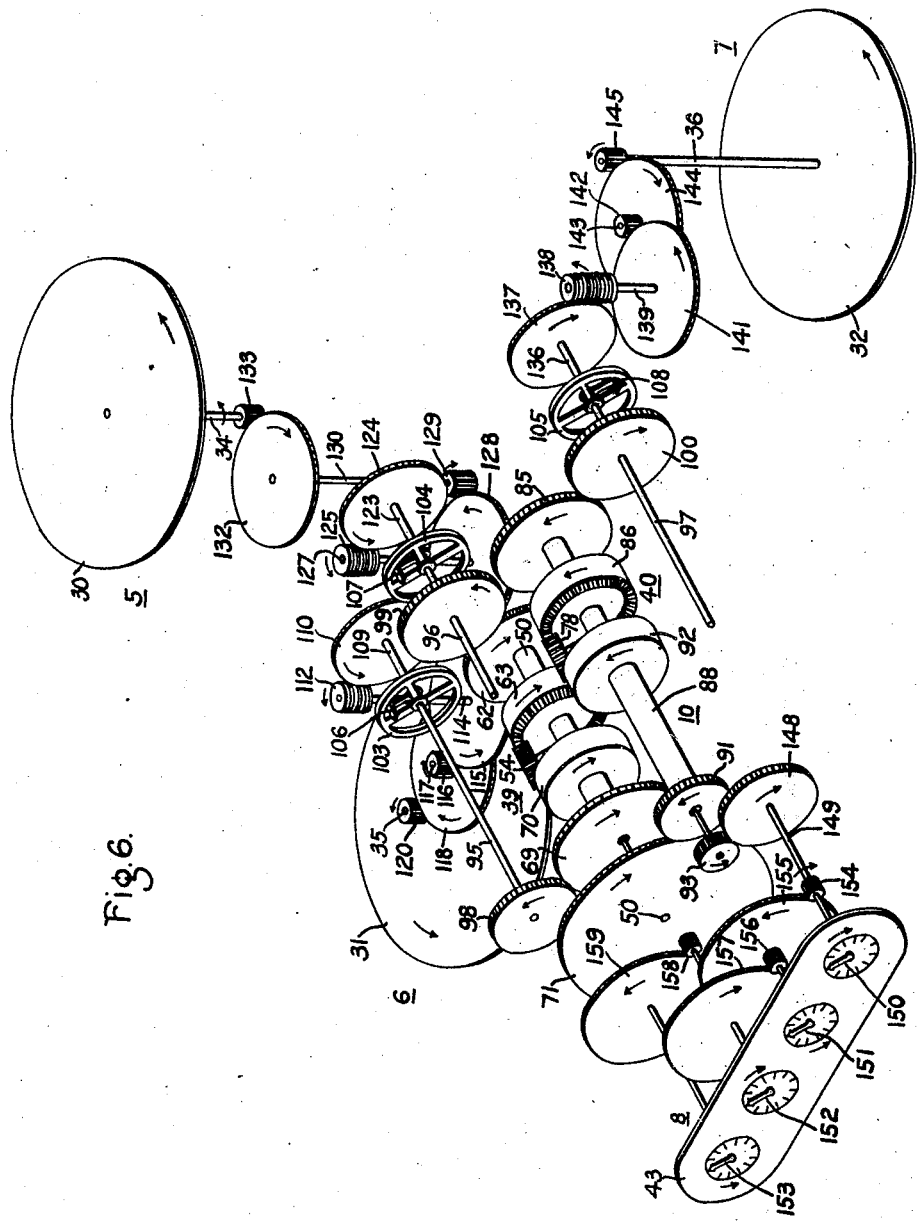

Figure 1 of the accompanying drawing is a front elevational view of a polyphase watthour meter embodying my invention, Fig. 2 is a side view, partially in elevation and partially in section, of the device shown in Fig. 1, Fig. 3 is an enlarged detail plan view of the differential gear mechanism and counting register, Figs. 4 and 5 are enlarged sectional detail views of portions of the gear mechanism as shown in Fig. 3, and Fig. 6 is a simplified or semi-diagrammatic perspective view of portions of the instrument of my invention, with the parts somewhat distorted and displaced for clearness.

In general, the device comprises a base member 1, a side-wall structure 2, a front cover member 3, a terminal structure 4, single-phase watt-hour meters 5, 6 and 7, a register or integrating mechanism 8 and a composite differential gear mechanism 10 comprising a pair of differential gear mechanisms, as will hereinafter be pointed out.

The base member 1, the side-wall structure 2, the front cover member 3 and the terminal structure 4 may be of any suitable material and construction and, since they constitute no part of the invention as claimed, further description thereof is deemed unnecessary, except to state that the meters 5, 6 and 7 are connected to their circuits (not shown) by terminal members 14 on the structure 4.

The meters 5, 6 and 7 are mounted in position on a bracket 15 that is secured to the base member 1 by standards 16 and screws 17.

The meters 5, 6 and 7 are of standard two-wire single-phase-watthour-meter construction comprising, respectively, actuating field-magnet structures 20, 21 and 22, damping magnets 25, 26 and 27 and armature disks 30, 31 and 32 that are mounted on shafts 34, 35 and 36. Since such meters are well-known to those versed in the art and it is only necessary to know that the disks 30, 31 and 32 rotate in accordance with the energy expended in their respective circuits, further description thereof is not deemed necessary to a full and complete understanding of the invention, as will hereinafter be apparent.

Referring more particularly to Figs. 3, 4, 5 and 6, in one of which (Fig. 6) the directions of rotation of the parts are indicated by arrows, the composite differential gear mechanism 10 comprises component differential gear mechanisms 39 and 40 as shown in detail in Figs. 4 and 5, respectively.

The mechanisms 39 and 40, together with the integrating mechanism 8, are supported by stationary plates 41, 42 and 43 that are held together in spaced parallel-plane relation by cross-tie members 45 and mounted on the bracket 15 by screws 46.

Referring to Figs. 3 and 4, the mechanism 39 comprises a shaft 50, journaled in the plates 41 and 42, upon which a shaft 51 is radially fixed by a sleeve portion 52. A pinion 54 is loosely mounted on a reduced portion 55 of the shaft 51 and held in position by a collar 56. A hub 59 that is loosely held in position near one end of the shaft 50 between collars 60 that are fixed thereto, carries a gear wheel 62 and a crown gear wheel 63 in fixed relation to each other. Similarly, a hub 65 near the other end of the shaft 50, is loosely held in position thereon between a collar 66 and another hub 67 that are fixedly mounted on the shaft 50. The hub 65 carries a gear wheel 69 and a crown gear wheel 70, similar to the crown gear wheel 63, in fixed relation to each other. The hub 67 carries a gear wheel 71. The crown gear wheels 63 and 70 engage the pinion 54 on opposite sides thereof.

Referring to Figs. 3 and 5, the mechanism 40 comprises a shaft 75, journaled in the plates 41 and 42, upon which a shaft 76 is radially fixed by a sleeve portion 77. A pinion 78 is loosely mounted on a reduced portion 79 of the shaft 76 and held in position by a collar 80. A hub 83, that is loosely held in position near one end of the shaft 75 between collars 84 that are fixed thereto, carries a gear wheel 85 and a crown gear wheel 86 in fixed relation to each other. Similarly, a hub 88 is loosely held in position near the other end of the shaft 75 between collars 89 that are fixed to the shaft 70 and carries a gear wheel 91 and a crown gear wheel 92 in fixed relation to each other. The crown gear wheels 86 and 92 engage the pinion 78. The shaft 75 further carries a pinion 93 fixed thereto.

Three shafts 95, 96 and 97, journaled in the plates 41 and 42 carry gear wheels 98, 99 and 100 engaging the gear wheels 69, 62 and 85, respectively, and dogs 103, 104 and 105, respectively, for cooperation with dogs 106, 107 and 108.

The dog 106 is connected to the armature disk 31 of the meter 6 through a shaft 109, on which the dog is mounted, a worm wheel 110 on the shaft 109, a worm screw 112 engaging the worm wheel 110, a shaft 114, on which the worm screw 112 is mounted, a gear wheel 115 on the shaft 114, a pinion 116 on the shaft 117, a gear wheel 118 on the shaft 117 and a pinion 120 on the shaft 35.

The dog 107 is connected to the armature disk 30 of the meter 5 through a shaft 123 on which the dog is mounted, a worm wheel 124 on the shaft 123, a worm screw 125 engaging the worm wheel 124, a shaft 127 on which the worm screw 125 is mounted, a gear wheel 128 on the shaft 127, a pinion 129 on a shaft 130, a gear wheel 132 on the shaft 130 and a pinion 133 on the shaft 34.

The dog 108 is connected to the armature disk 32 of the meter 7 through a shaft 136 on which the dog is mounted, a worm wheel 137 on the shaft 136, a worm screw 138 engaging the worm wheel 137, a shaft 139 on which the worm screw 138 is mounted, a gear wheel 141 on the shaft 139, a pinion 142 on a shaft 143, a gear wheel 144 on the shaft 143 and a pinion 145 on the shaft 36.

The gear wheel 71 on the shaft 50 engages the gear wheel 91 on the hub 88 to which the crown gear wheel 92 is also secured.

The pinion 93 which constitutes a common movable element for all of the armature disks and is responsive to movement of any number thereof, engages a gear wheel 148 constituting the primary or initial movable element of the integrating mechanism 8. Movement of the gear wheel 148 is transmitted to a pointer 150 through a shaft 149 and to pointers 151, 152 and 153 through successive speed-reduction gear wheels and pinions 154 to 159 in a usual and well known manner.

In operation, with all of the disks 30, 31 and 32 rotating in the same direction, the movement of the disk 30 is transmitted through the shaft 34, the pinion 133, the gear wheel 132, the shaft 130, the pinion 129, the gear wheel 128, the shaft 127, the worm screw 125, the worm wheel 124, the shaft 123, the dog 107, the dog 104, the shaft 96, the gear wheel 99, the gear wheel 62 and the hub 59 to the crown gear wheel 63 which thereby turns in the clockwise direction as viewed in the drawings.

At the same time, movement of the disk 31 is transmitted through the shaft 35, the pinion 120, the gear wheel 118, the shaft 117, the pinion 116, the gear wheel 115, the shaft 114, the worm screw 112, the gear wheel 110, the shaft 109, the dog 106, the dog 103, the shaft 95, the gear wheel 98, the gear wheel 69 and the hub 65 to the crown gear wheel 70, which thereby also turns in the clockwise direction.

Either one of the crown gear wheels 63 and 70 may be considered as stationary relative to the other, so that when one of them rotates, it will turn the pinion 54 on the other and carry the shaft 51 with the pinion 54 to rotate the shaft 50. Consequently, if the crown gear wheel 63 or 70, which is considered stationary relative to the other, also turns, as it does in this instance, the movement of the shaft 50 will be proportional to the sum of the movements of the crown gear wheels and of the meter disks 30 and 31.

This summated movement of the crown gear wheels 63 and 70 is transmitted from the shaft 50 through the hub 67, the gear wheel 71, the gear wheel 91, and the hub 88 to the crown gear wheel 92, which thereby turns in the counterclockwise direction, as indicated by the arrow in Fig. 6.

Also, at the same time, movement of the disk 32 is transmitted through the shaft 36, the pinion 145, the gear wheel 144, the shaft 143, the pinion 142, the gear wheel 141, the shaft 139, the worm screw 138, the worm gear wheel 137, the shaft 136, the dog 108, the dog 105, the shaft 97, the gear wheel 100, the gear wheel 85 and the hub 83 to the crown gear wheel 86 which thereby also rotates in the counterclockwise direction.

As in the case of the differential gear mechanism 39, here again, either one of the crown gear wheels 86 and 92 may be considered as stationary relative to the other, so that, when one of them rotates, it will turn the pinion 78 on the other and carry the shaft 76 with the pinion 78 to rotate the shaft 75.

Consequently, when the crown gear wheel 86 or 92, which is considered stationary relative to the other, also turns, the movement of the shaft 75 will be proportional to the sum of the movements of the crown gear wheels 86 and 92.

Thus, since the movement of the shaft 50, which is proportional to the sum of the movements of the disks 30 and 31, is transmitted to the crown gear wheel 92 and the movement of the disk 32 is transmitted to the crown gear 86, the movement of the shaft 75, and, consequently, of the integrating mechanism or register 8 will be proportional to the sum of the movements of all of the disks.

When the disk 32 is stationary and the disks 30 and 31 are rotating, the crown gear wheel 86 is stationary and the summated movements of the crown gear wheels 63 and 70 are transmitted to the register 8 by the shaft 50 to the crown gear wheel 92 which thereby turns the pinion 78 on the stationary crown gear wheel 86 to move the shaft 75.

When the disk 30 is stationary and the disks 31 and 32 are rotating, the crown gear wheel 63 is stationary and the movement of the crown gear wheel 70 is transmitted by the shaft 50 to the crown gear wheel 92. Since, in this instance, the crown gear wheel 86 is also rotating, the register 8 will be actuated in accordance with the sum of the movements of the disks 31 and 32.

Similarly, with the disk 31 stationary and the others rotating or with any two disks stationary and the other rotating, the movements will be transmitted, as described, to the register 8.

Thus, the register will be actuated in accordance with the movement of any one disk, the sum of the movements of any two disks or the sum of the movements of all the disks.

Since, in contradistinction to a meter having all of its disks on one shaft, the effects of each of the damping magnets 25, 26 and 27 are prevented from affecting the disks of the others, the instrument is free from the objectionable damping errors referred to.

The instrument is further extremely simple in construction and flexible in its operation and, by reason of the interchangeability of its standard meter units, permits ready replacements of the same at low cost and without undue interruption of service.

While I have shown and described a particular form of my invention, various modifications may be made therein without departing from the spirit and scope thereof as set forth in the appended claims.

I claim as my invention:

1. A meter comprising indicating means, a differential gear mechanism, a pair of meter elements connected one to each outside gear member of said mechanism, a second differential gear mechanism and a tertiary meter element connected to one of the outside gear members of said second differential mechanism, the intermediate gear member of said first differential mechanism being connected to the other outside gear member of said second differential mechanism and said indicating means being connected to the intermediate gear member thereof.

2. In a meter, the combination with three independently-movable meter elements and a register, of a pair of differential-gear mechanisms disposed in adjacent side-by-side relation, two of said meter elements being connected to the outside gear members of one of said differential-gear mechanisms, the intermediate gear member of said one differential-gear mechanism and the third meter element being connected to the outside gear members of the other differential-gear mechanism and the register being connected to the intermediate gear member of said other differential-gear mechanism.

3. In a meter, the combination with three independently-movable meter elements, a supporting structure comprising three plate-like elements disposed in spaced substantially parallel-plane relation, and a register supported between the first and second of said plates, of a pair of differential-gear mechanisms supported between the second and third of said plates, two of said meter elements being connected to the outside gear members of one of said differential-gear mechanisms, the intermediate gear member of said one differential-gear mechanism and the third meter element being connected to the outside gear members of the other differential-gear mechanism and the register being connected to the intermediate gear member of said other differential-gear mechanism.

In testimony whereof, I have hereunto subscribed my name this 28th day of January, 1925.

CARL OMAN.